United States Patent [19]

Rauls

[11] Patent Number: 6,156,833
[45] Date of Patent: Dec. 5, 2000

[54] EMULSIFICATION OF NON-AQUEOUS CHEMICAL ADDITIVES USING SOY METHYL ESTER AS THE CARRIER

[75] Inventor: Thomas E. Rauls, Higley, Ariz.

[73] Assignee: PCI Group, Inc., Tempe, Ariz.

[21] Appl. No.: 09/249,340

[22] Filed: Feb. 12, 1999

[51] Int. Cl.⁷ .............................. C08K 5/17; C08K 5/101; C11D 3/37
[52] U.S. Cl. ............................ 524/239; 106/34; 106/260; 106/504; 106/822; 510/417; 516/67; 516/73; 516/928; 524/315; 524/400; 526/932
[58] Field of Search ................................ 516/67, 73, 928; 526/932; 524/315, 400, 239; 106/31.05, 31.25, 34, 822, 260, 504; 523/160; 510/417

[56] References Cited

U.S. PATENT DOCUMENTS

| | | | |
|---|---|---|---|
| 3,386,835 | 6/1968 | Schaap | 516/73 X |
| 4,122,051 | 10/1978 | Friberg et al. | 516/67 X |
| 4,362,838 | 12/1982 | Leep et al. | 524/315 X |
| 4,451,267 | 5/1984 | Schwab et al. | 516/67 X |
| 4,618,630 | 10/1986 | Knobel et al. | 524/315 X |
| 5,116,408 | 5/1992 | Crozer | 106/34 X |
| 5,374,687 | 12/1994 | Cooperman et al. | 526/932 X |
| 5,407,474 | 4/1995 | Airey et al. | 106/31.05 |
| 5,569,701 | 10/1996 | Moynihan | 106/31.25 X |
| 5,969,004 | 10/1999 | Loftin | 523/160 X |

*Primary Examiner*—Richard D. Lovering
*Attorney, Agent, or Firm*—Warren F. B. Lindsley; Frank J. McGue

[57] ABSTRACT

An improved emulsification base and a method for manufacturing same for non-aqueous chemical additives comprises a mixture of water from 68 to 92 percent, of 2-amino-2 methyl-1 propanol from 0.1 to 0.2 percent, of an emulsifying surfactant blend from about 2.2 to 3.2 percent, of methyl esters of soybean oil from about 15–20 percent and of a 30% solution of polymer thickener from about 0.25 to 0.50 percent.

12 Claims, No Drawings

EMULSIFICATION OF NON-AQUEOUS CHEMICAL ADDITIVES USING SOY METHYL ESTER AS THE CARRIER

TECHNICAL FIELD

This invention relates in general to emulsifications of non-aqueous additives, and, more particularly, to such emulsifications using soy methyl ester as the carrier.

BACKGROUND OF THE INVENTION

The use of water based emulsions using soy methyl esters as a carrier is desirable for cementitious formulations since such emulsions are environmentally and user friendly and compatible with many other resins. In addition, such emulsions provide color uniformity and durability while exhibiting excellent adhesion. The surface preparation, application and clean up are quick, easy and safe.

However, such emulsions are not stable and thus have not found widespread use in the decorative concrete industry. For example, these emulsions will begin to separate when the solids levels reach about 20% and at 5% solids the emulsions will separate within one hour.

To solve this problem, the prior art uses a core shell technology in which the individual oil particles are covered with a "shell" which prevents the individual oil particles from recombining. However, this core shell technology is limited by compatibility and is suitable for use only with acrylic polymers.

Thus, there is a need for a stable, widely compatible, water based emulsion using soy methyl ester as the carrier. The present invention meets this need.

None of the known prior art disclose the formulas and methods set forth herein.

SUMMARY OF THE INVENTION

It is an object of this invention to provide an improved emulsion base for non-aqueous chemical additives.

Further objects and advantages of the invention will become apparent as the following description proceeds and the features of novelty which characterize this invention will be pointed out with particularity in the claims annexed to and forming a part of this specification.

DESCRIPTION OF THE PREFERRED EMBODIMENT

An improved emulsion of non-aqueous chemical additives employs soy methyl ester as the carrier. The resultant base is useful directly as a cleaning solution or as a basis for a number of products, including, but not limited to, concrete stains, sealants and colorants for cementitious substrates, sealants for tile, grout and concrete, release agents for asphalt or masonry and concrete metal molds or wood forms, concrete curing compounds or rejuvenators and sealers for asphalt.

The most preferred embodiment of the emulsion presently comprises the following components. All percentages given below are given as a percent by volume:

TABLE 1

| Component | Description | Preferred % | Range % |
|---|---|---|---|
| #1 | Water | 80.64 | 68–92 |
| #2 | 2-amino-2 methyl-1 propanol | 0.13 | 0.05–0.25 |
| #3 | Emulsifying Surfactant Blend (such as the product available as Witflo 928 Witco) | 1.82 | 1.0–3.0 |
| #4 | Methyl esters of soybean oil (such as the Soy Gold 2000 product available from AG Environmental) | 17.24 | 14.5–20.5 |
| #5 | 30% solution of acrylic polymer thickener (such as Acrysol TT935 available from Rohm & Haas) | 0.17 | 0.06–0.25 |
|  |  | 100.00 |  |

The method of preparing the above emulsion comprises the following steps:

TABLE 2

| Component | Step | Description | Preferred % | Range % |
|---|---|---|---|---|
| #1 | A | Water | 26.41 | 20–30 |
| #2 | B | 2-amino-2 methyl-1 propanol | 0.13 | 0.05–0.25 |
| #3 | C | Emulsifying Surfactant Blend | 1.82 | 1.0–3.0 |
| #4 | D | Methyl esters of soybean oil | 17.24 | 14.5–20.5 |
| #5 | E | 30% solution of acrylic polymer thickener | 0.06 | 0.01–0.10 |
| #1 | F | Water | .90 | 0.5–1.5 |
| #1 | G | Water | 49.81 | 40–60 |
| #5 | H | 30% solution of acrylic polymer thickener | 0.11 | 0.05–0.15 |
| #1 | I | Water | 3.52 | 2.0–4.0 |
|  |  |  | 100.00 |  |

To manufacture, first A is added to an open vessel having a mixer attached thereto. The mixer preferably uses high-shear, saw tooth cowels. To begin, the mixer is set to at about 900 revolutions per minute (rpm) to create a mixing vortex. Components B and C are added sequentially and gradually to a vortex thus created. The speed of the mixer is gradually increased to about 2500 rpm as component D is added. Once all of component D has been added, the resulting mixture is stirred at 2500 rpm for about twenty minutes.

Components E and F are premixed and the resulting premix is added to the vortex in the open vessel. The mixture is stirred at 2500 rpm for about ten minutes. Component G is gradually added to the open vessel and the mixture is stirred for about five minutes.

Lastly, components H and I are premixed and the resultant premix is added to the vortex and stirred for about fifteen minutes at 2500 rpm. At this point, the emulsion is complete.

The use of the acrylic polymer thickener as discussed is one key to the present invention. It is theorized that the thickener acts as a separator which prevents the individual oil particles from adhering to one another and thus causing separation of the emulsion. However, the use of the thickener, in contrast to the core shell technology, does not destroy the compatibility of the emulsion for use in connection with such materials as alkyds, silicones and the like as further described below.

Those skilled in the art will recognize that the above is for time and speed limitations are for purposes of illustration only and are not meant to limit the invention to those values.

The actual times and speeds will be dependent upon the mixing equipment used. The purpose is to provide sufficient time for the mixer to render the mixture in the vessel homogeneous.

In addition, the actual percentages given above constitute the most preferred embodiment of the basic emulsion. The ranges denote workable percentages but are not the most preferred embodiment of the basic emulsion.

The basic emulsion is used in the number of formulations to create a variety of products. The components employed in such formulations include, but are not limited, to the following elements:

TABLE 3

| Component | Description |
|---|---|
| #6 | Tetrasodium salt of ethylenediamine |
| #7 | Fluoro-surfactant |
| #8 | Blend of polystyrene and methyl esters of soybean oil |
| #9 | Defoamer |
| #10 | 72–75% linseed alkyd |
| #11 | Water reducible calcium drier |
| #12 | Water reducible cobalt drier |
| #13 | Water reducible zirconium drier |
| #14 | Anti-skin agent |
| #15 | Blend of refined polyethylene and paraffin wax |
| #16 | Dimethyl polysiloxane |
| #17 | Tall oil fatty acid |
| #18 | Acrylic emulsion |
| #19 | Waterbased Raw Umber dispersion |
| #20 | Waterbased titanium dioxide ($TiO_2$) dispersion |
| #21 | Waterbased Tinting Black dispersion |

EXAMPLE 1

Cleaning Solution

The following solution is suitable for cleaning concrete, grout and other cementitious substrates.

TABLE 4

| Component#/Step | | Preferred % | Range % |
|---|---|---|---|
| #1 | A | 25.41 | 20–30 |
| #1 | B | 1.00 | 0.50–1.50 |
| #6 | C | 0.12 | 0.05–0.25 |
| #7 | D | 0.16 | 0.1–0.3 |
| #2 | E | 0.13 | 0.05–0.25 |
| #3 | F | 1.82 | 1.0–3.0 |
| #4 | G | 17.24 | 14.5–20.5 |
| #5 | H | 0.06 | 0.01–0.10 |
| #1 | I | 0.90 | 0.5–1.5 |
| #1 | J | 49.81 | 40–60 |
| #5 | K | 0.11 | 0.05–0.15 |
| #1 | L | 3.24 | 2.0–4.0 |

To manufacture, first A is added to an open vessel having a mixer attached thereto. The mixer preferably uses high-shear, saw tooth cowels. To begin, the mixer is set to at about 900 revolutions per minute (rpm) to create a mixing vortex.

Component B is heated to 120° F. and component C is dissolved therein. The heated mixture of B and C is added to the vortex in the open vessel and mixed for two to five minutes.

Components D, E and F are added sequentially to a vortex thus created. The speed of the mixer is gradually increased to about 2500 rpm as component G is added. Once all of component G has been added, the resulting mixture is stirred at 2500 rpm for about twenty minutes.

Components H and I are premixed and the resulting premix is added to the vortex in the open vessel. The mixture is stirred at 2500 rpm for about ten minutes. Component J is gradually added to the open vessel and the mixture is stirred for about five minutes.

Lastly, components K and L are premixed and the resultant premix is added to the vortex and stirred for about fifteen minutes at 2500 rpm. At this point, the cleaning solution emulsion is complete.

EXAMPLE 2

Concrete Curing Compound

TABLE 4

| Component#/Step | | Preferred % | Range % |
|---|---|---|---|
| #1 | A | 26.41 | 20–30 |
| #2 | B | 0.13 | 0.05–0.25 |
| #3 | C | 1.58 | 1.0–3.0 |
| #8 | D | 10.67 | 15–20 |
| #5 | E | 0.11 | 0.05–0.15 |
| #1 | F | 3.48 | 2.0–4.0 |
| #1 | G | 52.23 | 40–60 |
| #5 | H | 0.23 | 0.15–0.30 |
| #1 | I | 5.16 | 3.5–7.0 |

To manufacture, first A is added to an open vessel having a mixer attached thereto. The mixer preferably uses high-shear, saw tooth cowels. To begin, the mixer is set to at about 900 revolutions per minute (rpm) to create a mixing vortex.

Components B and C are added sequentially and gradually to a vortex thus created. The speed of the mixer is gradually increased to about 2500 rpm as component D is added. Once all of component D has been added, the resulting mixture is stirred at 2500 rpm for about twenty minutes.

Components E and F are premixed and the resulting premix is added to the vortex in the open vessel. The mixture is stirred at 2500 rpm for about ten minutes. Component G is gradually added to the open vessel and the mixture is stirred for about five minutes.

Lastly, components H and I are premixed and the resultant premix is added to the vortex and stirred for about fifteen minutes at 2500 rpm. At this point, the concrete curing emulsion is complete.

EXAMPLE 3

Alkyd Dispersion

The alkyd dispersion of example 3 is used as the vehicle to produce stains for concrete or wood substrates. In addition, the dispersion is used as an intermediate to produce a water based stain/sealer for various cementitious substrates as shown below in Examples 6–8.

TABLE 6

| Component#/Step | | Preferred % | Range % |
|---|---|---|---|
| #1 | A | 30.01 | 20–40 |
| #3 | B | 1.82 | 1.0–3.0 |
| #9 | C | 0.53 | 0.20–0.80 |
| #2 | D | 0.25 | 0.10–0.30 |
| #10 | E | 6.02 | 4.8–7.8 |
| #11 | F | 0.25 | 0.15–0.30 |
| #12 | G | 0.26 | 0.15–0.30 |
| #13 | H | 0.47 | 0.30–0.60 |
| #14 | I | 0.26 | 0.15–0.30 |
| #4 | J | 2.77 | 2.0–4.0 |
| #4 | K | 3.46 | 2.5–4.5 |
| #15 | L | 0.66 | 0.50–0.8 |
| #5 | M | 0.23 | 0.15–0.30 |
| #1 | N | 3.90 | 3.0–5.0 |

TABLE 6-continued

| Component#/Step | | Preferred % | Range % |
|---|---|---|---|
| #1 | O | 45.00 | 37–52 |
| #5 | P | 0.51 | 0.35–0.65 |
| #1 | Q | 3.60 | 3.0–5.0 |

To manufacture, first A is added to an open vessel having a mixer attached thereto. The mixer preferably uses high-shear, saw tooth cowels. To begin, the mixer is set to at about 900 revolutions per minute (rpm) to create a mixing vortex.

Components B, C and D are gradually added sequentially to a vortex thus created. A premix is created in which components F, G, H, and I are added to component E under agitation. The premix is mixed for about ten minutes at 900 to 1000 rpm. The premix is then added to the vortex in the open vessel which continues to mix at 900 rpm.

A second premix is created whereby components L and K are combined under agitation and mixed for ten minutes or until homogeneous. The second premix is then added to the vortex in the open vessel and the mixture is stirred at 2500 rpm for about twenty minutes.

Components M and N are premixed and the resulting premix is added to the vortex in the open vessel. The mixture is stirred at 2500 rpm for about ten minutes. Component O is gradually added to the open vessel and the mixture is stirred for about five minutes.

A third premix comprising components P and Q is created and then added slowly to the vortex. The resultant mixture is stirred at 2500 rpm for about fifteen minutes. At this point, the alkyd dispersion emulsion is complete.

EXAMPLE 4
Release Agent for Asphalt

TABLE 7

| Component#/Step | | Preferred % | Range % |
|---|---|---|---|
| #1 | A | 42.00 | 34–50 |
| #2 | B | 0.13 | 0.05–0.25 |
| #3 | C | 2.73 | 2.0–4.0 |
| #4 | D | 25.52 | 20–30 |
| #16 | E | 0.74 | 0.50–1.0 |
| #5 | F | 0.11 | 0.05–0.15 |
| #1 | G | 3.55 | 2.5–5.0 |
| #1 | H | 19.44 | 18–22 |
| #5 | I | 0.23 | 0.15–0.30 |
| #1 | J | 5.75 | 4.5–6.5 |

To manufacture, first A is added to an open vessel having a mixer attached thereto. The mixer preferably uses high-shear, saw tooth cowels. To begin, the mixer is set to at about 900 revolutions per minute (rpm) to create a mixing vortex.

Components B and C are gradually added sequentially to a vortex thus created. A premix of D and E is created by adding E to D and mixing at 2000 rpm for five minutes. The premix is added to the vortex and speed of the mixer is increased to about 2500 rpm. The resulting mixture is stirred at 2500 rpm for about twenty minutes.

Components F and G are premixed and the resulting premix is added to the vortex in the open vessel. The mixture is stirred at 2500 rpm for about ten minutes. Component H is gradually added to the open vessel and the mixture is stirred for about five minutes.

Lastly, components I and J are premixed and the resultant premix is added slowly to the vortex and stirred for about fifteen minutes at 2500 rpm. At this point, the asphalt release agent emulsion is complete.

EXAMPLE 5
Release Agent for Concrete and Masonry on Metal or Wood Molds and Wood Forms

TABLE 8

| Component#/Step | | Preferred % | Range % |
|---|---|---|---|
| #1 | A | 26.41 | 20–30 |
| #2 | B | 0.13 | 0.05–0.25 |
| #3 | C | 1.45 | 1.0–2.0 |
| #4 | D | 7.62 | 6.0–8.0 |
| #16 | E | 0.98 | 0.50–1.50 |
| #17 | F | 2.11 | 1.5–3.0 |
| #5 | G | 0.11 | 0.05–0.15 |
| #1 | H | 3.48 | 2.5–5.0 |
| #1 | I | 52.33 | 45–55 |
| #5 | J | 0.34 | 0.30–0.40 |
| #1 | K | 5.04 | 4.0–6.0 |

To manufacture, first A is added to an open vessel having a mixer attached thereto. The mixer preferably uses high-shear, saw tooth cowels. To begin, the mixer is set to at about 900 revolutions per minute (rpm) to create a mixing vortex.

Components B and C are gradually added sequentially to a vortex thus created. A premix of D, E and F is created by adding E and F to D and mixing at 2000 rpm for five minutes. The premix is added to the vortex and speed of the mixer is increased to about 2500 rpm. The resulting mixture is stirred at 2500 rpm for about twenty minutes.

Components H and G are premixed and the resulting premix is added to the vortex in the open vessel. The mixture is stirred at 2500 rpm for about ten minutes. Component I is gradually added to the open vessel and the mixture is stirred for about five minutes.

Lastly, components K and J are premixed and the resultant premix is added slowly to the vortex and stirred for about fifteen minutes at 2500 rpm. At this point, the concrete and masonry release agent emulsion is complete.

EXAMPLE 6
Clear Sealer

The following formula provides a clear sealer suitable for use on tile, grout or concrete.

TABLE 8

| Component#/Step | | Preferred % | Range % |
|---|---|---|---|
| TABLE 6-Alkyd Dispersion | | | |
| | A | 36.35 | 29–43 |
| #7 | B | 0.28 | 0.20–0.50 |
| #18 | C | 18.75 | 15–22 |
| #1 | D | 37.19 | 30–45 |
| #1 | E | 7.20 | 6–8 |
| #5 | F | .23 | 0.15–0.30 |

To manufacture, first A is added to an open vessel having a mixer attached thereto. The mixer preferably uses low-shear or paddle blades. To begin, the mixer is set to at about 900 revolutions per minute (rpm) to create a mixing vortex.

Components B and C are gradually added sequentially to a vortex thus created. The resulting mixture is stirred at 1500 rpm for about fifteen minutes. Component D is added to the vortex and mixing continues at 1500 rpm for an additional fifteen minutes.

Components E and F are premixed and the resulting premix is added to the vortex in the open vessel. The mixture is stirred at 2500 rpm for about fifteen minutes. At this point, the clear sealer emulsion is complete.

EXAMPLE 7

Colorizer and Sealer

The following formula provides a colorizer and sealer suitable for use on cementitious substrates.

TABLE 9

| Component#/Step | | Preferred % | Range % |
|---|---|---|---|
| TABLE 6-Alkyd Dispersion | | | |
|  | A | 36.35 | 29–43 |
| #7 | B | 0.28 | 0.20–0.50 |
| #18 | C | 18.75 | 15–22 |
| #1 | D | 37.19 | 30–45 |
| #1 | E | 6.87 | 6–8 |
| #5 | F | .23 | 0.15–0.30 |
| #19 | G | 0.19 | 0.15–0.30 |
| #20 | H | 0.14 | 0.10–0.20 |

To manufacture, first A is added to an open vessel having a mixer attached thereto. The mixer preferably uses a low shear or paddle blade. To begin, the mixer is set to at about 900 revolutions per minute (rpm) to create a mixing vortex.

Components B and C are gradually added sequentially to a vortex thus created. The resulting mixture is stirred at 1500 rpm for about fifteen minutes. Component D is added to the vortex and mixing continues at 1500 rpm for an additional five minutes.

Components E and F are premixed and the resulting premix is added to the vortex in the open vessel. The mixture is stirred at 2500 rpm for about fifteen minutes. Components G and H can be added together or separately into the vortex and mixed for an additional fifteen minutes at 2500 rpm. At this point, the colorizer and sealer emulsion is complete.

EXAMPLE 8

Asphalt Rejuvenator and Sealer

The following formula provides a rejuventor and sealer suitable for use on asphalt.

TABLE 10

| Component#/Step | | Preferred % | Range % |
|---|---|---|---|
| TABLE 6/Alkyd Dispersion | | | |
|  | A | 72.73 | 65–80 |
| #7 | B | 0.38 | 0.20–0.50 |
| #18 | C | 11.36 | 10–12 |
| #1 | D | 12.00 | 10–14 |
| #1 | E | 2.28 | 1.5–3.0 |
| #5 | F | .03 | 0.01–0.10 |
| #21 | G | 1.22 | 1.0–2.0 |

To manufacture, first A is added to an open vessel having a mixer attached thereto. The mixer preferably uses a low shear or paddle blade. To begin, the mixer is set to at about 900 revolutions per minute (rpm) to create a mixing vortex.

Components B and C are gradually added sequentially to a vortex thus created. The resulting mixture is stirred at 1500 rpm for about fifteen minutes. Component D is added to the vortex and mixing continues at 1500 rpm for an additional five minutes.

Components E and F are premixed and the resulting premix is added to the vortex in the open vessel. The mixture is stirred at 2500 rpm for about fifteen minutes. Component G is added to the vortex and stirred for fifteen minutes at 2500 rpm. At this point, the asphalt rejuvenator and sealer emulsion is complete.

Although only certain embodiments have been illustrated and described, it will be apparent to those skilled in the art that various changes and modifications may be made therein without departing from the spirit of the invention or from the scope of the appended claims.

What is claimed is:

1. An improved emulsification base for non-aqueous chemical additives comprises a mixture of water from 68 to 92 percent, of 2-amino-2 methyl-1 propanol from 0.1 to 0.2 percent, of an emulsifying surfactant blend from about 2.2 to 3.2 percent, of methyl esters of soybean oil from about 15–20 percent and of a 30% solution of acrylic acid polymer thickener from about 0.25 to 0.50 percent.

2. The formulation of claim 1 further comprising additives selected from the group consisting of tetrasodium salt of ethylenediamine, fluoro-surfactant, blend of polystyrene and methyl esters of soybean oil, defoamer, linseed alkyd, water reducible calcium drier, water reducible cobalt drier, water reducible zirconium drier, anti-skin agent, blend of refined polyethylene and paraffin wax, dimethyl polysiloxane, tall oil fatty acid, acrylic emulsion, waterbased Raw Umber dispersion, waterbased titanium dioxide dispersion, and waterbased Tinting Black dispersion.

3. The formulation of claim 1 further comprising about 0.05 to 0.25 percent of tetrasodium salt of ethylenediamine and 0.1 to 0.3 percent of fluoro-surfactant.

4. The formulation of claim 1 further comprising about 15 to 20 percent of a blend of polystyrene and methyl esters of soy bean oil.

5. The formulation of claim 1 further comprising about 0.20 to 0.80 percent of a defoamer, 4.8–7.8 percent of a 72–75% linseed alkyd, 0.15 to 0.30 percent of a water reducible calcium drier, 0.15 to 0.30 percent of a water reducible cobalt drier, 0.30 to 0.60 percent of a water reducible zirconium drier, and 0.50 to 0.80 percent of a blend of refined polyethylene and paraffin wax.

6. The formulation of claim 5 further comprising about 0.20 to 0.50 percent of a fluoro-surfactant and 15 to 22 percent of an acrylic emulsion.

7. The formulation of claim 6 further comprising about 0.15 to 0.30 percent of a waterbased raw umber dispersion and from 0.1 to 0.20 percent of a waterbased titanium dioxide dispersion.

8. The formulation of claim 6 further comprising about 1.0 to 2.0 percent of a waterbased tinting black dispersion.

9. The formulation of claim 1 further comprising 0.50 to 1.0 percent of dimethyl polysiloxane.

10. The formulation of claim 9 further comprising 1.5 to 3.0 percent of a tall oil fatty acid.

11. A method of manufacturing an improved emulsification base for non-aqueous chemical additives comprising the steps of adding 20 to 30 percent of water to a vessel having a mixer attached thereto, agitating the water with mixer, adding 0.05 to 0.25 percent of 2 amino-2 methyl-1 propanol to the vessel, adding 1.0 to 3.0 percent of an emulsifying surfactant blend to the vessel, adding 14.5 to 20.5 percent of methyl esters of soybean oil to the vessel, agitating the mixture sufficiently to render homogeneous, premixing 0.01 to 0.10 percent of a 30% solution of acrylic acid polymer thickener with 0.5 to 1.5 percent water, adding the premixed acrylic acid polymer thickener and water to the vessel, agitating the mixture sufficiently to render homogeneous, gradually adding 40 to 60 percent of water to the vessel, agitating the mixture sufficiently to render homogeneous, premixing 0.05 to 0.15 percent of a 30% solution of acrylic acid polymer thickener with 2.0 to 4.0 percent water, adding the premixed acrylic acid polymer thickener and water to the vessel, and agitating the mixture sufficiently to render homogeneous.

12. The method of claim 11 further comprising the step of adding one or more additives selected from the group consisting of tetrasodium salt of ethylenediamine, fluoro-surfactant, blend of polystyrene and methyl esters of soy-bean oil, defoamer, linseed alkyd, water reducible calcium drier, water reducible cobalt drier, water reducible zirconium drier, anti-skin agent, blend of refined polyethylene and paraffin wax, dimethyl polysiloxane, tall oil fatty acid, acrylic emulsion, waterbased Raw Umber dispersion, water-based titanium dioxide dispersion, and waterbased Tinting Black dispersion.

\* \* \* \* \*